(No Model.)

S. MORNINGSTAR.
SOLDERING CASE.

No. 350,314. Patented Oct. 5, 1886.

WITNESSES:

INVENTOR:
S. Morningstar
BY Munn & Co.
ATTORNEYS.

N. PETERS, Photo-Lithographer, Washington, D. C.

UNITED STATES PATENT OFFICE.

SYLVANUS MORNINGSTAR, OF BUFFALO, NEW YORK.

SOLDERING-CASE.

SPECIFICATION forming part of Letters Patent No. 350,314, dated October 5, 1886.

Application filed June 19, 1886. Serial No. 205,657. (No model.)

*To all whom it may concern:*

Be it known that I, SYLVANUS MORNINGSTAR, of Buffalo, in the county of Erie and State of New York, have invented a new and Improved Soldering-Case, of which the following is a full, clear, and exact description.

My invention relates to soldering-cases, and has for its object to secure in a compact convenient form the various articles constituting a solderer's kit.

It consists in a block having a compartment formed therein to hold the solder, and a groove extending along the top at one side its entire length to receive the shank of a soldering-iron, together with a spring-actuated lid pivoted thereto, to which is secured an incased bottle for acid, the block and lid so combined as that when the lid is opened for use the incased bottle assumes a vertical position, forming a part of the base, together with the block; also, in certain details of construction, all of which will be hereinafter fully described, and set forth in the claims.

Reference is to be had to the accompanying drawings, forming a part of this specification, in which similar letters of reference indicate corresponding parts in both the figures.

Figure 1:
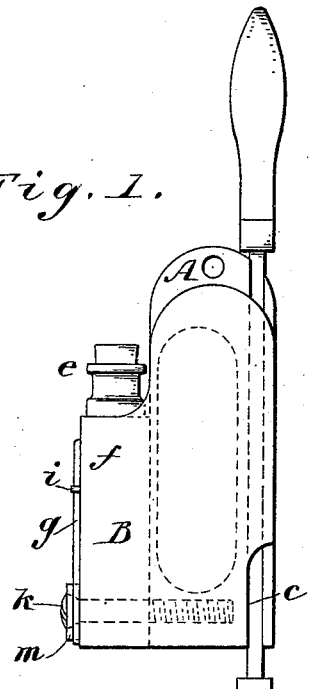
Figure 2:
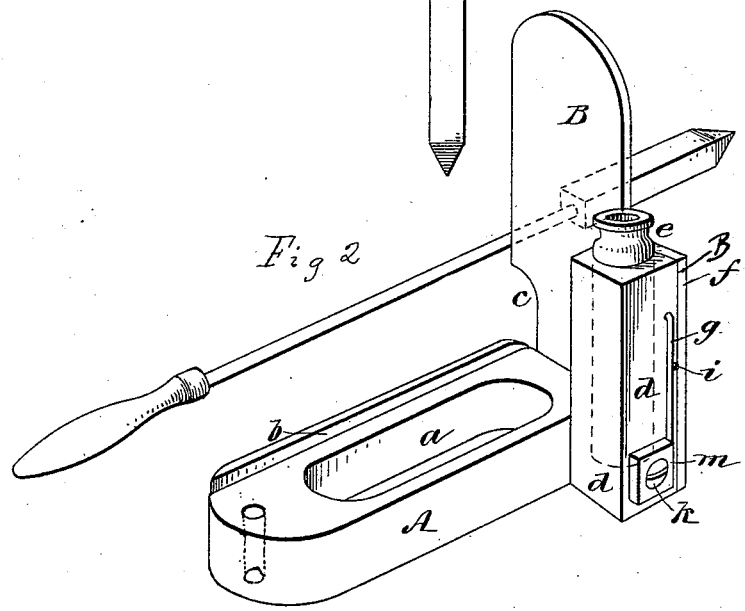

Figure 1 is a side view of my case closed and as it appears when hung upon the wall or elsewhere, and Fig. 2 is a perspective view of the same when opened up ready for use.

A designates a block formed with a compartment, $a$, adapted to hold solder, and provided with a groove, $b$, cut along the top at one side, in which the shank of a soldering-iron is placed, the handle extending from one end thereof, the iron from the other.

B is the lid, made to cover the compartment $a$ and groove $b$, and constructed of a greater width than the block A for a portion of its length. To this extended portion $f$ of the lid is secured the casing $d$, which surrounds and protects a bottle, $e$, purposed to hold acid. The lid B is of greater width than the block A only so far as to accommodate the casing $d$, conforming thereafter to the contour of said block. A screw-bolt, $m$, having a long shank, passes through the casing $d$ into the side of the block A at one end, and forms a pivot upon which the said casing, which is of the same depth as the block A, turns from a vertical position at right angles to the block occupied when in use, as shown in Fig. 2, to a position close to and parallel with said block A, which is its position when closed up, as shown in Fig. 1. The bottle and casing assume an upright position, however, when the case is hung up out of the way by means of a hole bored in the end, as shown, or any other equivalent device. One end of the block A is rounded off to form a bearing for the lid B in closing, and the said lid is cut away at $c$ on the side, to permit its passage over the shank of the soldering-iron when closed down, and the insertion of the iron in its groove when the lid is opened up.

The lid B and casing $d$ are controlled by a spring, $g$, situated upon the outside of said casing, having one end secured near the top, and bearing upon a pin, $i$, therein in its passage to a contact with a square plate, $k$, held to the casing $d$ by the head of pivot-screw $m$. The said plate $m$ is made integral with the head of the said pivot-screw $k$ by brazing or other equivalent means. When the casing $d$ and the lid B are thrown up to a vertical position, the spring $g$, bearing against the farther side of the plate $k$, holds the same steady, and as the lid and casing are turned down to a closed position the spring $g$, passing the corner of the said plate $k$, urges them forward, and when the lid B rests upon the block A, with the attached casing $d$ close beside and parallel with said block, the spring $g$, bearing upon the upper side of the plate $k$, keeps them securely closed.

The advantages of my invention are apparent. In one compact case I have all the necessary appliances for soldering—the iron, solder, and acid—so arranged that they can be hung up out of the way when not in use. When so disposed of, the acid-bottle is held in an upright position, therefore spilling or leakage is avoided. When taken down, the lid B, carrying the incased acid-bottle, can be quickly thrown up from contact with the block to an upright position, thereby exposing the solder and releasing the iron.

In operation, when the case is closed, as shown in Fig. 1, it is taken down, placed upon a stand or the floor, with the lid uppermost, and the rounded end of the block toward you. By pressing upon the block, to hold it steady, with one hand and raising the lid, carrying the incased acid-bottle to a vertical position with the other, the compartment containing the solder is uncovered, as is also the groove in which the shank of the soldering-iron is placed, thus releasing the same. The spring $g$ now holds the lid B and casing $d$ steady, they forming, together with the block A, a firm base for the case. Upon removing the cork from the bottle everything is at hand ready for use. By reversing this operation the case is closed, ready to hang up out of the way.

Having thus fully described my invention, I claim as new and desire to secure by Letters Patent—

1. A soldering-case consisting of a block provided with a solder-holding compartment, a groove for receiving the handle of a soldering-iron, and a cover pivoted to the block at one end and carrying a casing for an acid-bottle, substantially as and for the purposes herein set forth.

2. A soldering case constructed with a block having a compartment therein to hold solder and a groove extending its length along the side on top to receive a soldering-iron, in combination with a spring actuated lid carrying and inclosing an acid-bottle, the lid and inclosed bottle adapted to assume a vertical position when opened, substantially in the manner and for the purposes herein set forth.

3. A soldering-case adapted to hang up when not in use, consisting of a block, A, having compartment $a$ and groove $b$, a lid, B, a casing, $d$, attached to said lid and inclosing the acid-bottle, and a spring adapted to hold the lid B in the open or closed position, substantially in the manner and for the purposes herein set forth.

4. In a soldering-case, the block A, having compartment $a$ and groove $b$, the lid B, pivoted to the said block, and the casing $d$, attached to said lid, in combination with the spring $g$, fastened at one end to said casing $d$, bearing upon the pin $i$, and forming a contact at its lower end with the plate $m$, secured in position by the pivot-screw $k$, substantially in the manner and for the purposes herein set forth.

SYLVANUS MORNINGSTAR.

Witnesses:
   H. M. GEAR,
   DILWORTH M. SILVER.